United States Patent
Wu

(10) Patent No.: US 7,724,158 B2
(45) Date of Patent: May 25, 2010

(54) OBJECT REPRESENTING AND PROCESSING METHOD AND APPARATUS

(76) Inventor: Shengyuan Wu, 3-502 Building 1, No. 69 Jing Shi road, Jinan, Shandong (CN) 250061

( * ) Notice: Subject to any disclaimer, the term of this patent is extended or adjusted under 35 U.S.C. 154(b) by 1201 days.

(21) Appl. No.: 10/557,591

(22) PCT Filed: Jun. 3, 2004

(86) PCT No.: PCT/CN2004/000596

§ 371 (c)(1), (2), (4) Date: Nov. 18, 2005

(87) PCT Pub. No.: WO2004/109492

PCT Pub. Date: Dec. 16, 2004

(65) Prior Publication Data

US 2006/0294136 A1   Dec. 28, 2006

(30) Foreign Application Priority Data

Jun. 9, 2003   (CN)   ................................ 03 1 12401

(51) Int. Cl.
*H03M 7/00* (2006.01)

(52) U.S. Cl. .......................................... 341/50; 341/51

(58) Field of Classification Search .............. 341/50–51
See application file for complete search history.

(56) References Cited

U.S. PATENT DOCUMENTS 5,614,899 A * 3/1997 Tokuda et al. ................. 341/51
7,221,711 B2 * 5/2007 Woodworth ................. 375/246

FOREIGN PATENT DOCUMENTS

CN   1182234 A   5/1998

* cited by examiner

*Primary Examiner*—Khai M Nguyen

(57) ABSTRACT

Methods of multilevel mark and multilevel mark code are provided in this invention. The Methods can realize encoding of various objects, encoding of structures and interrelation of the objects. The methods can distinguish various object codes, make the encoding resources inexhaustible, and solve problem of various resource sharing. The present invention provides the related processing method, for examples, object inputting, outputting, searching, and etc. The present invention also provides related apparatus. The methods and apparatus provided by this invention can be broadly used in various regions in the world, in various fields, in various software and hardware.

16 Claims, 4 Drawing Sheets

| 1 | | | | | | | | 1 | | | | | | | | 0 | | | | | | |

| 0 | | 1 | |
|---|---|---|---|
| 00 | 0 1 | 00  00 | 0   0 1 |
| 0   1 | | 0  1 | |
| 0 1   0 1 0 1 | 0000001  01 | 0  1 | 0 1 |
| 01010101010101011111111111101010101010101 | | | |
| 汉字是表意文字。English is 字母式语言。 | | | |

 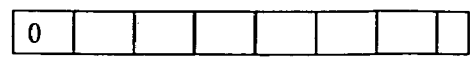
Fig. 1
 
Fig. 2
| 0 | | | | | 1 | | |
|---|---|---|---|---|---|---|---|
| 00 | | 0 1 | 00 00 | | 0 | 0 1 | |
| | 0 | 1 | | | 0 | 1 | |
| 0 1 | 0 1 0 1 | 0000001 01 | | 0 1 | | 0 1 | |
| 0101010101010101011111111111010101010101 | | | | | | | |
| 汉字是表意文字。English is 字母式语言。 | | | | | | | |
Fig. 3
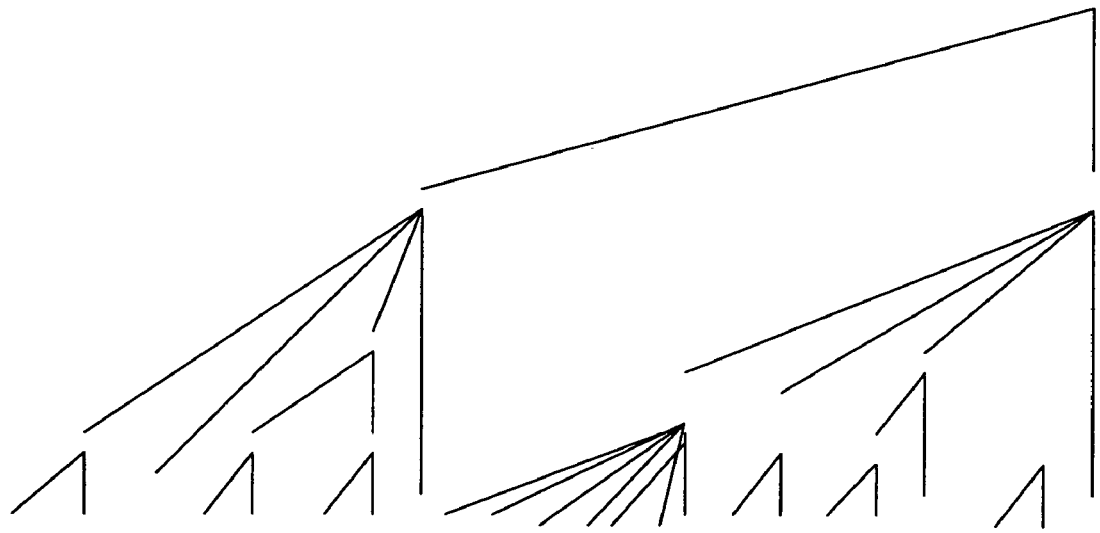
Fig. 4

| | | A | | | | | | |
|---|---|---|---|---|---|---|---|---|
| | B | | | | C | | | |
| D | | E | | | | F | | |
| | | | | G | | H | I | J |

| | | | | | A |
|---|---|---|---|---|---|
| | B | | | | C |
| D | | E | | | F |
| | | G | H | I | J |

| A | | | | | |
|---|---|---|---|---|---|
| B | C | | | | |
| D | E | | F | | |
| | | G | H | I | J |

| | | x | | | | w | | z | | | y |
|---|---|---|---|---|---|---|---|---|---|---|---|---|
| a | u | e | a | i | e | u | | o | i | o | o | u |
| l | l | m | n | l | m | n | l | l | m | | | n | m |

Fig. 9

| | | a | c | | d | | | | g | h |
|---|---|---|---|---|---|---|---|---|---|---|
| | | n | | e | u | | | | o | |
| t | | t | | | | a | | l | o | |
| | | e | | | | | | | | |
| | a | l | | | | | | | | |

(a)

| ant | anteater | antelope | chicken | deer | duck | goat | goldfish | goose | horse |
|---|---|---|---|---|---|---|---|---|---|

OBJECT REPRESENTING AND PROCESSING METHOD AND APPARATUS

TECHNOLOGY FIELD

This invention is related to methods and apparatus of object representation and processing. Objects are represented by codes or marks, the methods and apparatus of object processing are based on object representation.

BACKGROUND OF THE INVENTION

All codes used now, such as ASCHII, GB2312, GBK, BIG5, Unicode, international 10646 and etc., belong to non-multilevel mark codes; the multilevel machine codes. I proposed in CN 1122476A (ZL 94114104.7)and CN 1182234A (ZL96115997.9), also belong to non-multilevel mark codes. Singular machine codes and multilevel machine codes all belong to non-multilevel mark code.

DETAILED DESCRIPTION OF THE PRESENT INVENTION

First, this invention presents an object coding method called multilevel mark code method; second, presents an object coding method for multiple property object called multiple property code method; third, presents method of object input, output, and searching for objects, especially for coded input objects. In the study of object coding, the most important problem, or kernel problem, is how to distinguish different object codes and different classes of codes in a code sequence, the problem can be solved by marking mark bits of object codes; in practice, mark is also a kind of code. So fourth, this invention presents a method of object processing by multilevel mark. In the marking procedure of object sequence, various matrixes for tree structure have been naturally formed; this leads to the fifth: the matrix processing method of tree structure. The apparatus related of the methods above are the sixth aspect of this invention.

The Definition of Object

Object is something that perceptible by one or more of the senses, especially by vision or touch; object is perceptible thing. Image and text are object, and perceptible; voice is perceptible; the vibration of mobile phone is perceptible by feeling. Object can have a kind of structure. One object may consist of a lot of child objects. Object can be static or dynamic. Object can possess properties, behaviors or actions. The world consists of varieties of objects; each object may include data and program; program describes a serial actions or methods predefined and executable, and data describes properties or structure of object.

For examples, character, sentence, article, field, data base, math symbol, formula, expression, function, figure, image, photo, picture, music symbol, song, scene and movie, all are objects with information. Law of physics, symbol of chemistry, symbol of enterprise mark, program flow, experiment demonstration, data structure, mode; all are object.

Knowledge also is object, rule is also object.

Object can be one dimensional or multi-dimensional.

Object can be integral, or part of an integral object, for example, a cartoon and an actor of the cartoon; an actor and parts of the actor.

Object can be represented by code or mark, code or mark is also object. Mark and code can be changeable.

Remembering of something or counting can use knots of a rope; this is an ancient coding or marking method.

In digital times, mark and code can be realized by digital. The simplest mark can be binary 0, 1; the simplest code is also binary 0, 1.

Multilevel mark and multilevel mark code is a totally new marking and coding method.

1. Multilevel Mark Code (MMC)

The method of MMC is based on multilevel mark in section 4, in order to understand this section clearly, please read section 4 first.

Most popular code consists of binary bits.

There are two main difficulties in object coding. First, how to distinguish different kinds of codes, taking text as an example, some character code is one byte long, such as English; some character is two byte long, such as Chinese; how to distinguish different kind of codes in same code length, how to distinguish codes in different kind and in different code length? The second is how to solve the coding space problem, for example, only 64 k space for 2 byte coding.

MMC is realized by multilevel mark. Because no code length limited for MMC, so the coding space is unlimited, and any objects can be coded by MMC. Because multilevel mark is used in MMC, it is very easy to distinguish different codes and to distinguish different class of codes in a code sequence.

Object is encoded by multilevel mark code; and the encoding of multilevel mark code comprising the steps of:

(1) object code consisting of code segments, and the code segment consisting of binary bit;
(2) selecting mark bit in each segment;
(3) marking mark bits of the code segments by multilevel mark.

Code segment can be byte; for example, the code of English letter is one byte, the code of Chinese character is 2 bytes, or more bytes.

Multiple segments refer to two or more segments.

Selecting corresponding bit in each segment as mark bit, "corresponding bit" means that the position of mark bit in each segment is same, for example, the first bit in each byte as mark bit.

Here, the A mark or B mark in multilevel mark is binary 0, or 1.

The code encoded by multilevel mark (MM) is called as multilevel mark code; the code not encoded by multilevel mark is called as non-multilevel mark code. Therefore multilevel machine code or single machine code all belongs to non-multilevel mark code. There are different kinds of MMC, such as linked MMC, embedded MMC, combined MMC, inter mark MMC and etc.

Simple object can be represented by one MMC, complicate object can be represented by a set of MMC, and a set of MMC can have a definite structure.

MMC encoding makes it becomes possible that text, data, pointer and various objects can be processed in a code sequence.

The most popular coding segment is byte.

MMC can be used to execute operations of related object, for example, characters represented by MMC can execute operation about characters; matrix represented by MMC can execute matrix operation, and so on.

In the coding of MMC, object with high frequency can be coded in short MMC. Data or pointer can be represented by MMC, called MMC data or MMC pointer respectively, the length of MMC can be decided by the data range of the object. Various data structure can be represented by MMC, for example, list, tree structure, matrix and etc. The data in data structure can be represented by MMC. MMC can also be used to represent the relation among objects.

1.1 MMC for Different Class Objects

In order to distinguish different class object conveniently, set class segment in MMC. dividing MMC into two parts: class part and coding part; the information in class part can tell if the next segment (or segments) is class segment or coding segment (or segments); assuming the number of segments of a MMC is N, if N>2, then the information in class segment contains the code class information or of the coding class of the next segment (or segments); if N=2, then the information in class segment can tell the coding class of the next segment. The class segment can be one or multiple segments; also can be a part of a segment.

As scanning the MMC along one direction in MMC code sequence, if the code change from one class to another class, then put MMC with class segment related to the object class; later if the class of MMC not change, then the class segment of MMC can be omitted. If it is a default class of MMC for a definite length of MMC, then the class segment of MMC can also be omitted.

FIG. 1 illustrates a 2 byte MMC with class segment, the MMC uses Right 0 MM, the first byte is class segment, the mark bit of MMC is the first bit of each byte, the value of the mark bit of class byte is 1, and the value of the mark bit of the second byte is 0. The class byte explains the coding class of the second byte, for example, code of English letter.

FIG. 2 illustrates a 3 byte MMC with class segment, the MMC uses Right 0 MM, the value of the mark bits is 1, 1, 0, respectively; the first byte is class byte, it can tell if the second byte is class byte, or tells the class of the code consisted of the second and the third byte. If the second byte is a class byte, then it tells the code class of the third byte. If the class part of MMC can't be represented by one segment, it can use multiple segments; if the amount of class of a kind of MMC is less, the class part of MMC can use part of a segment.

In order to save space, if the class of a MMC in a code sequence can be recognized, the class part of the MMC can be omitted. If scanning from left to right, the class part can be omitted, but as scanning from right to left, the class of MMC might not be recognized. Therefore, for double direction scanning, keeps the class segment in the previous MMC before class changing and the first MMC class changed.

1.2 The Transformation Between Non-MMC and MMC

Method of transformation between non-MMC and multilevel MMC can make MMC compatible with Non-MMC.

The transformation non-MMC into MMC is called multilevel direction transformation, the transformation MMC into non-MMC is called single direction transformation.

The transformation depends upon the relation between non-MMC and MMC, the relation is: assuming the non-MMC of one kind of object consisting of N bytes, N>=1, among them if there are M bytes without mark bit, then the codes of the objects can be represented by $2^M$ class MMC, and add 1 class byte, there are $2^M$ different value, each related to one of $2^M$ class MMC; if there are J kind of non-MMC, each of them can be represented by $K_1, K_2, \ldots K_j$ respectively, then amount of all class is $$S = K_1 K_2 + \ldots + K_j$$

If 1 byte can't have enough space to represent all of them, add more class byte to the class part of MMC.

The said multilevel direction transformation comprising steps of

Recognizing the class of non-MMC;

Selecting the class part of MMC according to the class of non-MMC and its related mark bit value of the multilevel mark code;

Taking non-MMC as the coding part of MMC, and making the mark bits according to the coding requirement of MMC;

Combing the class part and the coding part as MMC of the non-MMC; the class part can be omitted if the class of MMC can be known by the context; if the length of MMC is equal to the length of a kind of MMC without class part, adding another class part to distinguish them.

The said single direction transformation comprising step of

According to the relation of class byte and related non-MMC, taking the coding part of MMC as the non-MMC; and resuming the mark bit value. If with class byte the MMC with class byte.

In the coding of non-MMC, usually take some bit of a byte as mark bit, for example, ASCII is 1 byte code with the first bit 0 as mark bit, the GB2312 for Chinese character is 2 byte code, the first bit of each byte is as mark bit with value 1, 1. For GBK of Chinese character code, the first bit of first byte is as the mark bit with value 1, and no mark bit in the second byte, this means that any bit in the byte can be 0 or 1. The mark bit of non-MMC influences the class part of its related MMC.

First, taking 1 byte non-MMC as an example, ASCII is 1 byte code with the first bit 0 as mark bit, so the MMC of ASCII can be represented by 1 class of 1 byte MMC. If 1 byte non-MMC without mark bit, i.e. the first bit can be 0 or 1, then it can be represented by 2 class of 1 byte MMC. In this case, add 1 class byte before it; as right 0 MM adopted, the first bit of the class byte is 1, the first bit of the second byte is 0, as illustrated in FIG. 1. For 2 byte MMC, the class byte can represent 128 class codes, and the second byte is the coding part. To save space, only the coding byte for same class MMC can be saved. If the coding byte is changed as multilevel direction transformation, non-MMC can be recovered.

Second, analyze 2 byte non-MMC. Taking Chinese as an example, GBK can be divided into two classes: one class with the first bit for both bytes is 1 (GB2312 is related to this class); another class with the first bit of first byte is 1, and the first bit of second byte is 0. Therefore, GBK can be represented by two kind of MMC, each related to one class above. Similarly, Big 5 can also be represented by two classes of MMC. In order to distinguish different classes of MMC, 1 class byte can be added before 2 byte code. The class byte can tell if the second byte is class byte, or which class of the 2 byte code; if second byte is class byte, the second byte can tell what class of the third byte code is. Refer to 3 byte MMC in FIG. 2

Similarly, to distinguish the classes of 3 byte non-MMC codes, 4 byte MMC can be used; and so on. Therefore, if different language characters mixed in a code string; usually, MMC is 1 byte longer than original code, because 1 byte class byte added. Obviously, the coding resource is unlimited by MMC.

Scanning a code string from left to right,. as code class changes, the first changed code should prefixed with class byte, and later on, in a code section, if the code class kept no change, then class byte of the codes in the section can be omitted.

To make bi-direction scanning possible, the first MMC after code class changed, and the last MMC before code class changed should be prefixed with code class.

In a code string, if the codes with a definite code length are default class of codes, the default codes can be without code class.

The codes in a code string with different kind of codes can be distinguished by outer multilevel mark.

The coding idea of Unicode is contrary to Huffman coding, because the code length of Chinese characters hardly be used is as same as the length of often used characters, and also as same as the length of English letters.

The distinguishing of different class of codes in Unicode is by the codes in code space, not by marking method.

The length of Unicode (UTF16) is 2 bytes. The length of MMC for 1 byte character codes is little more than 1 byte; because the class byte can be omitted most times, the length of MMC for 1 Chinese character codes is little more than 2 byte; because very rare the MMC with class byte, according to the frequency of GB 2312 in GBK, the average length of MMC for Chinese character codes is about 2.0002 bytes; so comparing language codes related to Unicode, the length of MMC is far less 1.5 byte in average.

If MMC is different to its related original codes, in order to distinguish different classes of codes, original codes should be transformed into MMC as in main memory, however in the media outside main memory, the codes can be stored by its original codes. However, taking Chinese characters an example, in order to keep phrase segmentation information, MMC should be stored not only in main memory; but also store in other store media; or store original codes and mark bits of MMC separately.

MMC is consistent with GB18030, and easy to transform into each other.

Phrases of different languages can be represented by MMC.

Next, take some examples of MMC of other objects.

The math symbols can be represented by MMC, and edited just as characters; for a math expression, it is easy to get the operation result by scanning the expression, and taking related operations.

One math symbol relates to one image in the font library, and relates to one MMC. One can input symbols just like inputting characters by the input codes of the symbol, the input codes can related to its name or part of its name.

The processing of math symbols is just like characters, for example, to change the size and color, edit or modify.

Similarly, music symbols, image icon, video frames, data structure can be represented and processed by MMC. The coding method of MMC can be used to various objects. Because most common used languages are letter based, such as English, the code is one byte and with the first mark bit 0, so MMC can be coded by multilevel mark with group representative 0, and because the mark bit of the first byte of Chinese character codes, such as GBK and Big5, is 1, so the coding of MMC is easy to be consistent with original codes by Right 0 multilevel mark.

Object group can be encoded by MMC, this is very important for group level processing; for example, to realize Chinese information processing in phrase level. Object group can be represented by MMC.

1.3 Different Kinds of MMC

There are many type of MMC, such as linked MMC, embedded MMC, combined MMC, inter mark MMC, and so on.

In object processing, taking at least one of the following multilevel mark code:

Linked MMC is related to an object in the data source by its location.

Embedded MMC is embedded together with its related object, and coded the code range inside.

Combined MMC combined the object codes according to MMC coding method.

Inter mark MMC located in object code string and coded the object relation information inside.

For linked MMC, if only one object in the data source, the location of data source is related to the MMC; if more than one objects, then linked MMC related to the position the object in the data source. Here, one object means the object is only related to one MMC; however, the object can be any object, and can be a combination of multiple objects. Linked MMC can relate outside object, or inner object, here, inner or outside refer to inner or outside of an object sequence.

Linked MMC can be nested, for example, a MMC for phrase with more than 1 character, the MMC is related character codes of the phrase, and each of the character codes is related to a font in the font library.

The boundary or range information is included in Embedded MMC, the boundary information can be size, or length, or range of object in the object sequence, and etc.

The objects to be embedded can be various objects, also can be object code.

Embedded MMC can be used to distinguish object information, for example, text information, object method information, such as media player.

An embedded MMC can relate to a file, and a code sequence with Embedded MMC can relate to a file. In order to be able to scan the code string in bi-direction, two embedded MMC can be put in the embedded object block. An embedded MMC can be represented by two MMC, Embedded MMC can be nested.

Embedded MMC can be transformed to linked MMC, vise versa.

Inter Marking MMC is just like marking an object sequence among the objects by MMC. For example, just like the marks in text, marks in the marking language, such as XML, and marks in formatting text, such as RTF.

As an example, the marks in marking up languages and formatting text, is a kind of marks, here called as letter grouped marks, such as <head>,<body>,<table width=#or%>, and etc. There are two kind of forms to set up inter marking MMC, one is to create a set of new marking symbols and its related codes; another is consistent with the marks now used. For the later form, MMC can be used to represent the grouped letter marks, such as <head>, <body> and etc. Then set up a relation table between letter grouped marks and MMC, and the MMC can be inputted just like the character inputting, and the MMC can be displayed as the related letter grouped marks. Different input table can be set up with different input methods.

The marks of various format text and the marks of various program languages can be presented by the similar method.

Combined multilevel mark code consists of multiple object codes grouped according to MMC coding method. First confirm the object codes to be grouped, segments of each code and the mark position of each segment, then mark the mark position by multilevel mark.

Taking an example, in the code system of GB2312, each code of a character is 2 bytes, and the mark bits are first bit of each byte, and with value 1. The mark position can take the mark bit of any byte of the character, as an example, the first byte is selected, then the mark bits of combined multilevel mark code of 2 character phrase are 11 01, for 3 character phrase are 11 11 01.

For MMC of Chinese character, the mark position can take the mark bit of each byte of the character, the mark bits of combined multilevel mark code of 2 character phrase are 11 10, for 3 character phrase are 11 11 10. The grouping of English words can have different choice.

Because the combined MMC is for a group of some of the original codes; comparing the limited amount of characters in a language, the amount of phrases is unlimited; the resource of combined multilevel mark code is also unlimited.

Two coding method of combined multilevel mark code for Chinese characters are as following.

If the MMC of Chinese character is 2 byte long, then take the group representative of each character of a phrase as the mark position; mark the mark position by the same kind of multilevel mark as the MMC of the characters.

If the code of Chinese characters of multiple character phrase is 2 byte long and with mark bit in one byte of the two, such as GB2312, Big5, GBK, then take one of the mark bit of each character as mark bit, and mark the mark bits by multilevel mark.

Similarly, object groups can be represented by multilevel marks. The transformation method between the mark bits of MMC of an object group and the multilevel mark of the object group is as following. Selecting the mark bits of the MMC, and store the mark bits in the multilevel mark storage space, then transformed into multilevel mark; replacing the related mark bits in the related object group by multilevel mark, then multilevel marks transformed into combined MMC.

General speaking, the code resource is enough if the phrases of one language are coded by 3 byte or 4 byte MMC (here not refer to combined MMC), it is recommended to code the often used phrases shorter, and not often used phrases longer.

1.4 Sequential Objects

A sequence consisted of N nodes, N>=1, each node related to an object, which is called node object, node object consisted of M sub objects, M>=0; then, node object and sub object can be represented and processed by MMC.

Sub object can consist of sub objects.

If M=0, taking an example, a movie consists of segments, such as scenes or frames; each segment can relates to a linked MMC, and segment can include text information, the text information may include multiple languages. The linked MMC related to movie can be edited or modified just like text editing or modification. The MMC sequence can be played by a player. This makes movie editing easier.

In above example, MMC can relate to multiple movies, or one movie; a set of MMC can reflect the level relation of movies and their segments. For example, the first level, MMC points to movie; the second level, MMC points to segment; the third level, MMC points to lower segment, and etc.

If M>0, taking an example, one node relates to a scene of an active object, which relates to a MMC, sub objects of a node object relates to a group of MMC, such as actors in a cartoon, the parts of the actor. Assuming an actor consists of two parts, the body and its arm; and the body and one arm kept no change during the actor moving; then the body and the arm can be represented by a MMC, and the changed arm can be represented by multiple MMC, each relates to a form of the arm. Thus if N>1, the related MMC can represent the moving actor. If N=1, a static actor.

Digital man, music, and song can be represented by above method.

Linked MMC can act as an outer mark of objects by MMC. Linked MMC points to the object in the data source, such as column or row in table; and points to function, formula, paper, dictionary, and etc. . .

Linked MMC is similar to link in OLE, and character code to font library. MMC can have the characteristic of layers, and can be edited and modified in text.

Linked MMC can be divided into two classes, the first relates to linking to outside objects of an object sequence, and the second relates to inner objects. The first class linked MMC points to the object in the data source outside the object sequence; the second points to the object inside the object sequence.

As an example of embedded MMC, a movie consists of segments, there is at least one embedded MMC related to a segment, locating in front of the segment, or after the segment. The embedded MMC includes the information about the segment, such as the length of the segment, the text information of the segment, icon and play program of the segment. The embedded MC sequence can be scanned forward if the embedded MMC in front of the segment; scanned backward if the embedded MMC after the segment. The MMC sequence can be scanned bi-direction if there are two MMC for each segment, one in front of and one after the segment.

The embedded MMC for a movie can be edited or modified as text, and played by player. The embedded MMC for multiple movies can be edited or modified as text. The class part of the MMC can be used to distinguish different movie. Embedded MMC is similar to embedding in OLE, but more flexible and more convenient.

Binary information, such as communication information, can be marked not only by multilevel marks, but also by MMC, and MMC can include error information, so can be used to correct errors made in transmission.

A binary sequence can be grouped into segments according to some rule, then the segments can be marked by MMC, and the MMC includes some information of the related segments.

1.5 Data Compression by MMC

MMC can be used to compress data by one or more operations in the following:
(1) representing the repeating times by MMC; If compressing repeated objects in an object sequence,
(2) representing Objects in high frequency by shorter MMC;
(3) representing Objects in low value by shorter MMC
(4) Setting up an object group library outside the object sequence, and representing the related object group in the library in the sequence by MMC;
(5) Setting up an object group library inside the object sequence, and representing the related object group in the library in the sequence by MMC.

MMC can be used to various data compression, related to objects outside sequence or inside sequence.

In compression, the length of MMC can be selected according to the data value; MMC can be used as pointer to link the compressed information. the length of MMC can be selected according to appearing frequency in order to decrease store space; MMC can be used to represent the compressed information. Select proper segments of the MMC in compression.

It is very important to select proper length of MMC, relative less marking bits by multilevel marks if the length long, and relative more marking bits by multilevel marks if the length short. MMC can have coding segment with different length.

In order to solve too many mark bit problem in MMC, MMC can be used as inner mark, in which the coding segment length and amount of segments included. For example, the coding segment is 2 bits, 10 segments, and etc.

Taking Chinese text as an example, the frequency of the 127 Chinese characters with highest frequency is 44.9683%. If these characters are represented by 1 byte MMC, then the compression rate=45/200=22.5%; because one Chinese character takes 2 bytes, 100 Chinese characters take 200 bytes; there are 45 MMC in 100 Chinese characters, each MMC with 1 byte.

The compression rate will be higher, if phrases of multiple characters with higher frequency are represented by MMC.

In text compression, phrases with higher frequency can be represented by short MMC, longer MMC for lower frequency.

For 7 bit coded letter, such as English letter, the spaces between words can be compressed. For example, the first bits of each letter of a word can be marked by right 0 multilevel marks, and then the spaces can be omitted.

The amount of object group libraries outside sequence can be greater than 1.

MMC can be used to realize compression similar to RLE (run length encoding). This kind compression can be called repeated object counting compression, MMC is used to represent the repeated character and the repeated times.

MMC can be used to realize compression similar to LZ-77. The information appeared. again later can be represented by MMC.

As MMC used to realize outside dictionary compression, set up an outside dictionary, MMC relates to item of the dictionary; in the compressed text, the text related items of the dictionary are represented by related MMC.

As MMC used to realize inner dictionary compression, the length of MMC can be varying, and MMC can include information related to compressed text information, such as location, length of information. Therefore, a related dictionary can be set up, the length of items of the dictionary can be different, and the amount of items of the dictionary is not limited. This is better than LZW method.

The compression methods can be mixed.

For data compression, such as the compression of image and voice; the data can be divided into frames, which can be represented by embedded MMC, the data inside the frame can be represented by MMC, no matter the data is in time zone or in frequency zone. The repeated frames in frame sequence can be represented by MMC. The frames appear again latter can be represented by MMC. The latter frame can be represented by the difference delta between the frames.

The objects appearing sequential in a space can be represented by MMC, for example if B object appearing after A object, then B object can be represented by the difference between A and B object.

Data structure and data can be compressed and stored separately, and compressed by different compression methods.

In various program languages, the data length is definite for a specific type of data, no matter the size of data is bigger or less; however, the data length can be flexible as the data represented by MMC.

If the length of integer type can vary, then store space can be saved. For example, taking 1 bit of each byte as marking bit, then 7 bits of 1 byte can be used to represent data, if 1 bit used as symbol to represent positive or negative data, then 6 bits can be used to represent the size of the data. Therefore, 16−2−1=13 bits can be used to represent data size for 2 byte integer, 24−3−1=20 (bits) for 3 byte integer, and so on. Data and pointer can be represented by MMC, which is called as MMC data and MMC pointer respectively, the length of MMC is depended on the value range of the objects being represented by the MMC.

The data coding steps are as following:

According to the size of the data, whether symbol bit needed, and what the representing form of the data; select proper code segment, and the amount of segments, select the mark bit, then encoding the data or pointer by marking the mark bits by multilevel mark.

The objects with higher frequency can be represented by short MMC.

The coding steps are as following:

(1) Selecting proper code segment with N bits;

(2) Coding the objects with high frequency by 1 code segment, N−1 bits for value, the mark bit marked by multilevel mark;

(3) Selecting 2 code segments, taking (2N−2) bits of the 2 segments to code the less high frequency objects, and the mark bit marked by multilevel mark;

(4) Selecting more segments if necessary, repeating the coding process until all objects coded.

2. Multiple Property Code of Objects

As everyone knows, there are multiple properties for Chinese characters, such as font, pronunciation and meaning. However, a Chinese character code is only related to its grapheme, no matter its pronunciation or meaning. There are a lot of Chinese characters with multiple pronunciations. For a polyphone character, it is hard to distinguish what its correct pronunciation, because the code of the character is related to multiple pronunciations. Similar situation happens for character meaning. Similar situation also happens in other objects. For example, a video can have multiple properties, such as voice, text and images. A movie can relate to multiple properties, such as one movie related to multiple languages, a drama may relate to different music or different performance. A book can relate to different translation version. An operation system relate to different language version and so on.

Object code is often encoded by one of its property, and one property may relate to multiple characteristics (the meaning of "characteristic" is as same as "property", here only used to distinguish in different level). The object with multiple properties is called as multiple property object. Generally speaking, it is hard to distinguish the correct properties for multiple property object. This is the reason to introduce multiple property code. It is impossible without enough code resource to do so. However, it is easy by the method of multilevel mark code, because MMC method presents unlimited code resource.

As it is hard to distinguish what the correct properties for a multiple property object, the object can be encoded by multiple codes, each relates to a property, this kind of code called as multiple property code.

for a multiple property object, as the object code not directly relate to one property, adding a multiple property code to relate to this property, a multiple property object in an object group is encoded by multiple property code relative to correct property. This kind of code called as multiple property code.

The above method can deduce a multiple property code method for polyphone Chinese characters:

For a Chinese polyphone character with N pronunciations, add adding (N−1) multi-property codes to the character, so there are N codes for the character, each relates to one pronunciation; a polyphone character in a phrase is represented by its multiple property code with correct pronunciation.

A method to solve the problem of Chinese polyphone is presented in Chinese patent No. N 1182234A (ZL 96115997.9). To solve the polyphone in phrases, the method uses phrase phoneme library. However, the new method of solving the problem of Chinese polyphone in phrases is not by phrase phoneme library, it is by multiple property codes of the polyphone characters. The new method can save space and operation time. There are about 830 polyphone characters in GB2312, which includes 6763 characters. Most of the polyphone characters are often used characters. There are 5 polyphone characters in the first ten high frequency characters, with frequency 4%; they are "的, 了, 不, 和, 大".

Phrase with multiple characters may be with different pronunciations, for examples: 好事(haǒshi), 好事(haóshi) and etc.

There are about 1300 phonemes in Chinese character pronunciations; one phoneme is related about 5 characters in GB2312.

Next is the method of distinguishing pronunciation of polyphone character by multi-property code;

The method comprises at least one of the steps of:

To distinguish Chinese polyphone character with N different pronunciations by adding (N−1) multi-property codes; the said multi-property code of polyphone character with the following mark bit: the mark bit with mark bit 1, 1, if the original code of the polyphone character belongs to GB2312; with mark bit 1, 0 if the original code of the polyphone character belongs to GBK but not in GB2312, i.e. the original mark bits are 1, 0.

The advantages of above method is to make the multi-property codes of Chinese polyphone characters consistent with Chinese character codes use now, so the code length of MMC is short for often used, and longer for rarely used. In reference CN 1182234A (ZL 96115997.9), only different mark bit was pointed; However, the relation between code length and frequency was not considered.

Polyphone character can be represented by MMC; and Polyphone phrase can also be represented by MMC.

The method above makes the coding of Chinese character code, Polyphone character code and MMC consistent.

Chinese full pronunciation is a kind of marking to Chinese character pronunciations.

Chinese full pronunciation consists of two bytes, in which two letters, each letter 5 bits; and 5 pronunciation notes, 3 bits.

The phoneme information of a Chinese character code without note information can be represented by two letters. If the sequence of two letters is sequenced according to the related pinyin sequence of Chinese character codes, for example, pinyin "a" is represented by two letter "aa", pinyin "ai" is represented by two letter "ab", pinyin "an" is represented by two letter "ac", and so on. The relation between pinyin and its two letters is called pinyin-two letter mapping table. The full pronunciation above is called as sequenced full pronunciation. The sequenced full pronunciation of Chinese character codes is one form of full pronunciation.

Chinese sequenced full pronunciation consists of two bytes, in which two letters, each letter 5 bits; and 5 pronunciation notes, 3 bits; the size sequence of the two letters are selected according with the sequence of Chinese syllable represented by Pinyin (or phonetic notation); the value of the 3 bits is selected according with the note sequence in the standard dictionary.

The method above can be used in Zhuyin, which is a marking form of Chinese character pronunciation, which is still used in Taiwan.

In Chinese patent CN 1182234A (ZL 96115997.9), the concept of full pronunciation is presented, but not the concept of sequenced full pronunciation. The difference is that sequenced full pronunciation can be used in comparison between Chinese character strings; however, full pronunciation can't be used in comparison between Chinese character strings.

According to the sequence of a Chinese character coding system, set up a sequenced full pronunciation table, each item of the table is the sequenced full pronunciation of the character related to the coding system; then, because the sequence of the sequenced full pronunciation in the table is consistent with the sequence of the character codes in the coding system, so for a given character, it is easy to get the related sequenced full pronunciation by the table. In another words, Chinese characters can be transformed into its sequenced full pronunciation by the table. Different phoneme representing of Chinese characters can be transformed each other, sequenced full pronunciation can be transformed into Pinyin, Shuangpin, or Zhuyin.

Sequenced full pronunciation table is the table of sequenced full pronunciations of Chinese character codes the sequence of sequenced full pronunciations is consistent with Chinese character code system.

Set up a table called pinyin-two letter mapping table, to mapping the each two letter into its pinyin; then, by sequenced full pronunciation table, a sequenced full pronunciation can be transformed into its pinyin letters and its note.

Various Chinese phonemes can be transformed each other, such as Pinyin, Shuangpin, Zhuyin, or sequenced full pronunciation. According to the relation among Pinyin, Shuangpin, Zhuyin, set up relation tables to realize the transformation.

According to the relation between the Chinese character codes and the sequenced full pronunciations, the phonemes can be transformed from the Chinese character codes by the following steps:

(1) According to the sequenced full pronunciation table, generating the sequenced full pronunciation of the related Chinese character code;

(2) According to the relation table between the two letters and its related pinyin (or related Zhuyin), generating the pinyin (or Zhuyin) and its note.

Next apparatus can be used to transform Chinese codes into its speech.

(1)☐voice library apparatus; used to store the voice of the related sequenced full pronunciation;

(2)☐index apparatus: used to store the index of the voice library apparatus, for the related sequenced full pronunciation;

(3)☐transformation apparatus: according to the index in index apparatus and sequenced full pronunciation, calculating the voice location of the sequenced full pronunciation in the voice library.

According to the relation table between Chinese character code and its sequenced full pronunciation, outputting the voice of the Chinese character by the following steps:

(1) Generating the sequenced full pronunciation of the character according to the relation table between Chinese character code and its sequenced full pronunciation;

(2) Retrieving the location of the voice related to sequenced full pronunciation in voice library by index apparatus of the sequenced full pronunciation;

(3) Retrieving the voice in the voice library by the location.

3. Coded Input Object Processing Methods

In object processing, such as input, output, transformation, and transferring and etc; the most important is how to representing the objects. For examples, the objects can be represented by MMC, or by multiple property codes. Object processing is closely related to object representation.

In a MMC sequence, the class of a MMC can be distinguished by its class part. For display of text, according to the class of the character, retrieving the font in the related font library, display the font in the screen. For a nested MMC, such as a MMC of multiple character phrase, first retrieve the codes of the characters by the MMC, then retrieve the font in the related font library of the character codes, and display the fonts in the screen. In text to speech, first to distinguish the code class according to class segment, then retrieve the phonemes of the related characters, and then retrieve the voice data in the voice library related to the phonemes. In object inputting, according to different class of objects, different input method, retrieve MMC of object, or multiple property codes or multilevel mark.

Object inputting can include various objects, text is most common object, and other objects can be image, video, music and etc.

The input codes of objects are codes related the objects for inputting the objects. Object codes are used to object processing. As inputting object, input the input codes of the object, and then transform the input codes into its object code in the machine. In order to distinguish input codes and object codes, input codes are also called as outer codes, and object codes are also called as machine codes. In this invention, the input codes of object can not only used in inputting, also can used in object searching, outputting and other object processing.

The methods of object inputting can be divided into two classes: no-coded input method and coded input method. For a given kind keyboard, if the amount of characters in the code system is less than the amount of keys for inputting characters, then press one key can input a character; this is called no-coded input method, because it doesn't need to code more keys to input a character. The inputting of English belongs to this kind method in computer keyboard. For a given kind keyboard, if the amount of characters in the code system is more than the amount of keys, then press one key can't input a character; in this case, in order to input the characters, it does need to code more keys to input a character. In this case, an input code table is set up; the table contains the relation between object codes and input codes. This kind method is called coded input method. For example, the input method of Chinese characters belongs to this kind method in computer keyboard. Another example is the inputting of English in the telephone, or hand phone; because the amount of keys in this situation is less than the amount of letters, so it needs coded input method. For Chinese inputting key board, a special keyboard designed for inputting Chinese characters, because only pressing one key can input a Chinese character, in this case, the method belongs to no-coded input method. Therefore, what kind input method should be used is determined by the key amount of a keyboard and the amount of the characters in a code system. If the amount of objects for one kind of objects is more than the amount of keys of a kind of keyboard, the inputting of an object in the objects can't be done by only pressing one key, so object input codes which are coded by more than 1 key are used to input the objects; this kind input method is called coded input method. The characteristic of coded input method is that in the object inputting, one object can relates to more than one key in the keyboard. If the amount of objects for one kind of objects is not more than the amount of keys of a kind of keyboard, the inputting of an object in the objects can be done by pressing a single key, this kind input method is called no-coded input method. The characteristic of no-coded input method is that in the object inputting, one object only relates to one key in the keyboard.

The object inputted by coded input method is called coded input object; and the object inputted by no-coded input method is called no-coded input object.

Objects can also be inputted by image recognition or voice recognition, such as pen input or Optical character reader (OCR), or speech recognition. The inputting by image recognition or voice recognition first retrieves the characteristics of objects, then input objects according to the characteristics.

Here, an input code table is needed in the object inputting, the input codes relates to the characteristics of the objects. Therefore, these are also coded input method.

The input method by image recognition or voice recognition can be no-coded input method, for example, in speech recognition, if phonemes is so selected that each phoneme only relates one object, that is one phoneme can be used to input one object, this kind input method is no-coded input method. If more than 1 phoneme is used to input objects, then the input method is coded input method. For example, characters the pronunciation of which consists of phonemes can be inputted by input codes, each of them consists of phonemes.

A big amount of objects represented by non-MMC, MMC or multiple property cods are coded input objects. For example, embedded MMC can be inputted, or searched by the text in the related objects; in this case, the related text can be as the input code of the objects.

Input codes of objects can be coded by one of properties of the objects, for example, the pinyin inputting of Chinese characters are based on the phoneme property of the characters; and stroke inputting of Chinese characters are based on the strokes of the characters. Input codes of objects may also be coded by multiple properties of the objects. Because polyphone Chinese characters, Chinese text to speech, the Pinyin output of text, text inputting and text searching by phoneme exist severe problems.

The processing method for coded input objects is as following:

the input code table of coded input objects only consists of the relation between each singular object and its input code, as the object code sequence is consistent with the input code sequence, then only consists of input codes of the objects sequenced according to the object code system sequence; object codes can be no-multilevel mark code or multilevel mark code; the processing method for coded input objects comprises of generating the input code from the object codes, that is to generate the input code for the data to be processed according to the object input table; for multiple property object, eliminating the confusion of input codes for one object code by multiple property codes.

The key step is "generating the input code of relative object codes for the related data according to the object input code table"; "the related data" can be object groups of object group library or objects of data resource used for inputting; in object searching, "the related data" is the objects of data source to be searched.

Input codes can be input codes inputted by keyboard, or input codes transformed by image or voice.

The method above can be used in object inputting, object searching by input codes, and object input code output.

Object inputting or object searching for coded input objects is as following:
 (1) inputting input codes for objects to be inputted or to searched;
 (2) generating input codes of object codes in related data according to object input code table;
 (3) retrieving the inputted objects or searched objects by comparing the inputted input codes with the generated input codes;

The output method of object input codes comprises of the steps of the following:

Generating input codes of object codes in related data according to object input code table by scanning the related data;

In the object processing above, multiple input code tables can be used, each relates to one input method; and one or multiple data sources can be used; in the comparison, if too many objects are matched, inputting another input codes related to another input method, and then select the objects to be inputted or searched from the objects or object groups matched multiple input code tables.

Above "The input code table of coded input objects only consists of the relation between each singular object and its input code" means that no object group input codes In the object input code table, because the input codes of object group consists of the input codes of the objects comprised the object group, in object processing, object group table can be used, but no input codes are needed in the object group table.

The said "related data" can be object groups of object group library or objects of data resource used for inputting; in object searching, "the related data" is the data source to be searched. However, the said "related data" does not include input code table. Object group table can be the object group table the input method provided, and also can be the object groups in the related data sources, such as in database, text, web pages, and the text included in image, voice and video files.

In order to process information conveniently, the item length of input code table can be equal, If not equal, can be transformed to equal by the method similar to full pronunciation, or sequential full pronunciation.

If the item length of input code table is equal, and if the sequence of input code table is consistent with the sequence of related object code system, then the input code table can only contain the input codes of related objects.

Combined MMC of multiple character phrase or MMC of multiple character phrase can be used in the object searching.

The English inputting in phone or hand phone can use the input method of coded input object.

The methods above can be used in Chinese inputting, searching and output.

the object is Chinese characters, input code table is sequential full pronunciation table sequenced according to Chinese character code sequence. The sequenced full pronunciation of Chinese character code consists of two bytes, in which two letters, each letter 5 bits; and 5 pronunciation notes, 3 bits; the size sequence of the two letters are selected according to the sequence of Chinese syllable represented by Pinyin (or phonetic notation); the value of the 3 bits is selected according to the note sequence in the standard dictionary.

The comparison of two Chinese character strings can be done by the comparison between the related sequential full pronunciations of both strings.

The comparison processing of two Chinese strings are as following:
A. Retrieving the related sequential full pronunciations of both strings
B. Comparing the related sequential full pronunciations of both strings.

Get the comparison result of the strings by above comparison. Chinese inputting and searching can use phoneme codes, such as pinyin, zhuyin, or shuangpin; phoneme codes can be inputted by keyboard, or transformed by speech. Phonemes of Chinese information can output by sequential full pronunciations.

The advantages of the methods above are as following:

Taking the book searching by author as an example, input the input code of the author to be searched, such as pinyin string, then transform pinyin string into sequenced full pronunciation, at the same time, transform the author string in the author field into sequenced full pronunciation according to sequenced full pronunciation input code The comparison can be done by the sequenced full pronunciation strings, user can select the author in the comparison result. Similarly, the method above can be used in inputting. Because any data source can be used as object group library, the author field of a database can be used as phrase library in inputting, it is easy to input author name by the library. In the method above, the speed is high in searching and inputting. &

Because object group can be represented by MMC, so the object processing is in group level. If the object is text, then the text processing is in phrase level. Taking Chinese as an example, it is in character processing level without MMC, however, with MMC, it is raised to phrase level. Therefore, the searching is more precise.

The processing is more precise by multiple property code, for example, if polyphone characters are presented by multiple property code, then it is convenient to search Chinese information by phonemes.

For no-coded input object, the object codes consists of letters, so objects can be searched by inputting letters.

However, for coded input object, the object searching used before this invention can be divided into two steps: first, transform the input codes into object codes; second, compare the object codes between the transformed object codes and the object codes in the object data source.

For coded input object searching, In method proposed here, not necessary transform input codes into object codes, The object is searched directly by the input codes of the objects to be searched; and the object codes in the data source can be transformed into input codes; then compare the input codes between the inputted input codes and the transformed input codes.

In order to realize the input code searching, an input code table is needed, and one object code relates to only one input code string; if relates more than one input code string, then multiple property code is used to make the input code string singular. Multiple language text can be searched by input code method.

It is easy to realize multiple language searching by input code searching. Input one language, translate it into another language, after searching finished in the language, and then translate into original language. Two languages can be searched by the third language. For example, in order to search French by Chinese, first translate Chinese into English, then into French; and then translate the searched result into English, then into Chinese.

Input code searching method can be used in different code system. For example, In Chinese code GB2312 and Big5 system, if the searching is by character codes, then input codes must be transformed into character codes in different code system first. However, by phoneme input code searching, because the phonemes of a character are same for different code system, so it is only necessary to transform character codes into input codes by different input table.

The speed of input code searching is higher, the reason is: first, no need to transform input codes into object codes in the inputting; second, the searching can be done as the input code inputting; third, the searching phrase library is extended library, the said extended library is that any phrases of any data sources can be phrases of phrase library; although larger the library may be, the library is closely relevant for searching. Speech searching can be divided into two steps: first, transform the voice information into input codes; second, search the objects by input codes.

In Chinese speech searching, first to transform the speech into phonemes, then search the text by phonemes.

Coded input object inputting is further explained as following:

Coded input objects can be various objects, such as character, image, voice and etc.

For examples, a paragraph of text can be inputted by some characters; inter mark MMC and embedded MMC can be inputted by some characters; similarly, for object group and combined MMC of object group. For an image library, the images can be inputted by text. This kind of input method can be divided into two steps: first, if the related characters are coded input objects, input the characters by input codes; otherwise, input the characters directly; second, take an input code table, which consists of the relations between text for inputting and MMC related to the coded input objects. If input codes are designed for this kind of objects directly, then object inputting can be done by one step.

Input code table above is a relation table between single object and its input codes, object groups can be set up before or can be generated automatically during inputting, but in the object groups no input codes inside; during inputting, according to input code table, the object groups can be inputted by the input codes of objects consisted of the related object group. Because there are no input codes for object groups in input code table, multiple object group tables can be used in inputting; and object groups can be in different locations, in different forms, and in different data resources, such as database, text files. So, this kind input code table is called as opened input code table.

In the input methods now used, one input method only relates to one input table, there is no a single method which can realize two input methods by inputting two kinds of input codes in one input code table, or by two input code tables.

An input method, which can input objects or object groups by multiple kinds of input codes, is called cascade input method. Cascade input method can speed up inputting rate.

In above processing, multiple input tables can be used, and one or multiple data resources can be included. As too many objects for selecting, inputting input codes of another input method, then select the objects to be inputted or searched in the objects for selecting. This is called as cascade input method.

A compound input code table can be used in cascade input method, and the compound input code table contains the relation between objects and input codes for two or more input methods. Cascade input method can use compound input table or two or more input code tables for different input methods.

If the input codes of each item related to first input method in a compound input code table are in equal length, the second input codes can be put just after the first without separating by symbol.

The characteristics of cascade input method are as following:

Coded input objects can be inputted by cascade input method; in which a compound input code table can be used, the compound input code table contains the relation between objects and input codes for two or more input methods, or multiple input code tables can be used, each of the tables relates to one input method; cascade input method realize object or object group inputting by inputting input codes of two or more input method, cascaded inputting comprising the steps of:

(1) inputting input codes of one class;

(2) comparing the inputted codes with related class of input codes in the compound input code table or with input codes of related single input code table;

(3) going to (5) if satisfied results can be selected;

(4) if too many objects or object groups to be selected, inputting input codes of another input method, then selecting the satisfied results;

(5) retrieving the satisfied results.

Cascade input method can be used in Chinese inputting, for example, the first input method is a phoneme method, such as pinyin, zhuyin or shuangpin;: the second input method is shape-phoneme method, in which, Chinese character is divided into two parts according to the shape of the character, and each part is represented by the phoneme of the part. This method can reduce redundant phrases or characters.

Cascade input method can be used in object searching by input codes.

If adopting multilevel mark in inputting procedure, the multilevel mark information can be stored in the store media.

4. Multilevel Mark (M Mark)

In order to descript object, or multiple objects, in order to descript the properties of object, the relations of objects and the object structure; in order to distinguish objects and to distinguish object groups, marks can be used. Mark is also a kind of object. Marks can be classified according to different standards.

Marks can be classified into bit mark, byte mark, letter combined mark, code mark, and etc. according to the symbols the mark used.

Marks can be classified into inner marks, inter marks, and outside marks according to the position the marks located.

Inner marks: marks located inside of object to be marked, such as the bit 1 mark in the first bit of the bytes of Chinese character.

Outside marks: the marks are outside the object to be marked.

Inter marks: the marks are among the objects in an object sequence. Inner marks, inter marks, and outer marks can be transformed from one kind to another.

Definition of A, B mark: Two different objects: A object and B object, used as mark, are called A mark and B mark respectively.

Here the different objects means that two objects can be distinguished from each other. Two objects, which is complement each other, are often used as A mark and B mark; such as true and false in logic; a set and its complement set, a letter and not a letter; above a value and below the value; in a data and not in the data; empty and not empty, left and right, and so on; all can be used as A mark and B mark. Another example, in a $B^+$ tree, the node without data is empty; the node with data, the number of data may be different, 2 or 3 data, no matter how many, the node is not empty. This can also be used as A mark and B mark.

Two objects in binary system: 0, 1 can be used as A mark and B mark, which can also be called as 0 mark and 1 mark respectively.

Definition of object grouping: The procedure to distinguish the objects into object groups in an object sequence according to some ruler is called object grouping. In an object sequence, object grouping for consecutive object is called consecutive grouping, otherwise is called no-consecutive grouping.

The important role of A and B mark is to mark an object sequence to realize object grouping, that is to distinguish object groups in an object sequence by A and B mark.

marking object groups in an object sequence with multilevel mark;

the said multilevel mark is one of the following:

Right A multilevel mark: the rightest object in an object group marked with A mark; the other N objects in the object group marked with B mark; A Mark is called as group representative;

Left A multilevel mark: the leftest object in an object group marked with A mark; the other N objects in the object group marked with B mark; A Mark is called as group representative;

Right B multilevel mark: the rightest object in an object group marked with B mark; the other N objects in the object group marked with A mark; B Mark is called as group representative;

Left B multilevel mark: the leftest object in an object group marked with B mark; the other N objects in the object group marked with A mark; B Mark is called as group representative;

The said N is positive integer or 0.

For non-consecutive grouping, if there are objects not belong to the object group in consecutive objects, not mark these objects by A mark nor B mark.

There are only two direction as scanning an object's sequence, left to right, or right to left; For convenience, the other directions, such as up down direction, down up, and etc. can relate left to right, and right to left direction.

Examples are taken as following:

Right A mark example: A, BA, BBA, BBBA, BBBBA

Left A mark example: A, AB, ABB, ABBB, ABBBB

Right B mark example: B, AB, AAB, AAAB, AAAAB

Left B mark example: B, BA, BAA, BAAA, BAAAA

For Right A mark, A mark is called as group representative; if an object sequence is marked as: ABABBABBBBABBBA; then 1 object in first group, 2 objects in second group, 3 objects in third group, 5 objects in fourth group, 4 objects in the last group. The group representative in multilevel mark is the sign of object group.

0 and 1 mark can be two different combinations of binary 0 and 1. Refer to the example of non-consecutive mark in section 4.3 inter multilevel mark.

The four classes of M marks can be transformed from each other. For examples, the complement of each bit of right 0 M mark can be transformed into right 1 M mark; the complement of each bit of left 0 M mark can be transformed into left 1 M mark; exchange the leftest bit and the rightest bit of a right M mark, then become a left M mark. In practice,. the properties possessed y a right M mark as scanning from left to right is similar to properties possessed by a left M mark as scanning from right to left.

Object grouping can be done by any kind of M marks.

An M marks is called as inner M mark if the mark inside the object, an M marks is called as inter M mark if the mark among objects in an object sequence, and an M marks is called as outer M mark if the mark outside the object.

4.1 Outer M mark

Outer M mark is in outside the object sequence to be marked, characterized as: the marks can't be confused with the objects to be marked, and the marking is simple. An outer M mark marking method is illustrated by an example of marking Chinese and English text bottom up. In multiple language text, different text in different code system and usually in different code length, so it is difficult to distinguish them. In order to distinguish different codes, outer M mark can be used. An example of marking procedure is illustrated in FIG. 3. In the example Right 1 M mark is used. Each byte can be marked in 1 marking byte.

First, marking each byte by the first bit of each marking byte, English letter is 1 byte code, marking 1; Chinese character is 2 byte code, marking 01.

Next, mark the words. Mark the first level word by the second bit of each marking byte, and second level word by the third bit of each marking byte. A word can consist of 1 character or 2 characters, and so on. Assume the fourth bit of each marking byte mark sentences, the fifth marking paragraphs. Then 1 paragraph can form a tree.

The bottom line in FIG. 3 is the text to be marked.

The second line from bottom is mark for the text; English letter is 1 byte code, marking 1; Chinese character is 2 byte code, marking 01.

The third line from bottom is word marking. Because the group representative is 1, so Chinese phrase or word "汉字" is marked 0, 1 respectively, and just above the 1 mark in the second line. The marking procedure is similar to "表意","文字", "字母" and "表意","文字", "字母";"English" is a word, so mark 0000001; and "is" is a word, so mark 01.

The fourth line from bottom is marks for 3 character word or 4 character word, "表意文字" is consisted of "表意" and "汉字" the "0" mark relates to the "1" mark of "表意", and "1" mark relates to "1" mark of "文字", "字母式" is consisted of "字母" and "式", the mark "0" and "1" relates to mark "1" of "字母" and mark "1" of "式", respectively. The fifth line from bottom is marks for sentences. The first sentence is consisted of "汉字","是" and "表意文字". The marks of "0001" relate to each word. The second sentence is consisted of "English", "", "is", "", "字母式","语言", and "。", there are seven parts in this sentence, in which "" represents space. Each of marks of "0000001" relates to the each part.

The sixth line from bottom is marks for paragraph consisted of two sentences, each of the marks of "01" relates to each sentence.

It is obvious that the marking procedure above forms a matrix, and the matrix can represent tree structure.

FIG. 3 is a block diagram illustrating marking procedure by right 1 multilevel mark for string with Chinese and English text: "汉字是表意文字。English is "字母式","语言" and a matrix is generated by the marking procedure.

FIG. 4 is a block diagram illustrating tree generating procedure by multilevel marking. The leaves of the tree relate to characters, the intersection of lines is inner node, and relate to words or sentences. In order to relate Right matrix later introduced, the tree is drawn in tipsy form M mark can be done in text inputting to mark the inputted text.

Inner M mark, inter M mark and M mark can be transformed from each other.

M mark can be used in information transmission. For example, one channel is the information to be transmitted, and another channel is outer marks of the transmitted information.

Outer M mark can be used in intersect object grouping, for example, the intersect groping of 照相机(Meaning camera)

Each character can use 3 bit marks, and right 0 M mark is used.

Right 0 M mark: 110, grouping the 3 characters into one group: 照相机

Right 0 M mark: 100, grouping the 3 characters into two groups: 照相机

Right 0 M mark: 010, grouping the 3 characters into two groups: 照相机

Here the character "相" can be grouped into "照相" or grouped into "相机", this can be called intersect grouping.

The object grouping of object sequence can be represented by matrix, some elements in which are M marks; the matrix can be used to represent tree structure. The generation of matrix comprises of the following steps:

(1) Marking the objects in lowest level into object groups by M mark, and generating one row of matrix;

(2) Marking the objects in level higher into object groups by M mark, and generating one row of matrix upper;

(3) Repeating the step 2, until marking finished, and the matrix generated.

If binary 0, 1 M mark is used in the operations above, then a logic matrix generated. If replacing the group representatives in the matrix by the related data, then an entity matrix of tree structure is generated.

The objects in an object sequence are grouped level by level; each grouping is the grouping of group representatives. The nodes of the tree structure represent the object or object groups.

4.2 Inner Multilevel Mark (Inner M Mark)

Inner M Mark can be used in coding of multilevel mark code.. Multilevel mark code is realized by multilevel mark. Object groups in an object sequence are grouped and distinguished by multilevel mark marked in the objects.

Objects can be represented and processed by multilevel mark code; the coding of multilevel mark code comprising the steps of:

(1) Object code consisting of code segments, each segment consists of coding locations;
(2) Selecting at least one coding location as marking location for each segment;
(3) Marking the marking locations of each segment by multilevel mark.

Codes coded according to the rules of multilevel mark are called as multilevel mark code; otherwise are called as non-multilevel mark code. Therefore, the single machine code and multilevel machine codes in the references CN 1122476A and CN 11 82234A are all non-multilevel mark code.

Some examples of multilevel mark code are as following:

Assume one code segment consists of four bytes, A mark is any letter of 26 English letters, and B mark is any one in {0, 1 . . . 9}. The marking location is the first byte of each segment, and is marked by right B multilevel mark. Then, the codes following is satisfied the condition of multilevel mark code.

abcd 26ds; 4hgd; gb3d ji34 2arf;

The examples above show that the number of code segments is not restrained. The first code consists of 2 segments, the second code consists of 1 segment, and the third code consists of 3 segments.

Another characteristic of the codes above is that the letter and digit are marks. This is different from multilevel mark code in binary codes, there, in the mark locations are only o, 1marks.

The most useful MMC consists of binary bits. This has been introduced in section 1;—the related methods introduced there can also be used in this section.

The length of segments can be different, for example, 2, 4, 8 bits, or multiple bytes. However, it must be defined before.

English word can be grouped by multilevel mark. As everyone knows, the first bit of each English letter is 0. Taking right 0 multilevel mark, the first bit of each letter for a word is set to 1, except the last letter of the word. Then, the word is marked by multilevel mark. If deleting the spaces between the words, the words can be distinguished also.

Objects in time sequence can be grouped by multilevel mark. For example,

| 1 | X | 1 | X | 1 | X | 1 | X | 1 | X | 1 | X | 1 | X | 0 | X |
|---|---|---|---|---|---|---|---|---|---|---|---|---|---|---|---|

Multilevel marks are marked in the data above, which is 8 bits data. Here, "X" represents 0 or 1. In the data transmission, if errors of the marks appeared, the possibility of data errors happened in high probability. Errors of data transmission can be analyzed by this method.

The outer M mark can be transformed to inner mark, the outer M mark of word or phrase can be transformed to inner M mark of combined MMC. The inner M mark of MMC of Chinese phrase can be transformed to outer M mark.

4.3 Inter Multilevel mark (Inter M mark)

Inter M mark is marked among the objects in object sequence. Inter M mark can be divided into consecutive and non-consecutive M mark. Taking an example:

| 1 | 1 | 1 | 1 | 1 | 1 | 1 | 0 | X | X | X | X | X | X | X | X |
|---|---|---|---|---|---|---|---|---|---|---|---|---|---|---|---|

In the table above, "X" represents data. 11111110 is consecutive mark. It says the next 8 bits are a group of data. There is at least one bit of data, a least one bit of mark in applications of inter M mark.

As multiple bits marking, different marks can group different object group, and represent different meaning.

For example, assuming 4 English words, and assuming a phrase consists of the first word, the third word and the fourth word. Putting following marks in the front of each word,

| 11 | 10 | 11 | 00 |
|----|----|----|----|

And declare that with marks "11" means the word is part of the phrase, with mark "10" means the word not part of the phrase. In the example, the M mark 1 relates to "11", and the M mark 0 relates to "00". This is an example of non-consecutive inter M mark. As right 0 mark used in non-consecutive inter M marks, from the first mark to right, if the mark met is not mark 1, nor mark 0, then the object isn't belong to the object group. The object group is ended as mark 0 is met. If first mark is 0, then the object group only contains one object. This method can be used in inner M mark and outer M mark.

M mark can be used to group objects in a set, that is to say the set can be represented by one segment or multiple segments, each segment contains marking element, which is represented by M mark.

In information transmission and communication, the information consists of bits, called bit stream, M mark can be used to mark the bit stream. The method to mark a bit stream by outer M mark is described as following:

Marking each bit of the bit stream by outer M marks, and generating a mark bit stream;

Sending data bit stream and mark bit stream respectively.

If the method to mark a bit stream by inner M mark is described as following:

Dividing the bit stream into segments with equal length;
Adding mark bit to each segment;
Marking the mark bits with M marks.

5. Representing and Processing of Object Tree Structure

Tree can be represented by tree structure, or data of the tree (entity of tree), or both structure and data. The data of tree nodes can be in different forms, such as one data, multiple data, image, text, voice and etc. As it is difficult to represent the data in the node, the node can store pointer or MMC, which points to the real data. A tree whose node can have arbitrary number of children is called general tree. A tree whose child node can have one more children than its parent have is called A-B tree, such as binary trees 2-3tree, B-tree, B⁺ tree and etc. For multiple dimension tree, the children number is $N=2^D$, here, N is children number, D is number of dimension. Tree and sub tree can be represented by matrix. Matrix can be classified into right matrix, left matrix, left right matrix, trapezoid matrix, list matrix, and block matrix. The operations of tree can be classified into structure operation and entity operation. If the structure operation of two trees is not equal, then, the tree can't be equal. The operation of trees can be divided into two steps: structure operation and entity operation.

An object sequence can be marked by M mark, a matrix can be generated by the marking procedure, and the matrix can be used to represent tree structure. Tree nodes can be marked by M mark, and this can also generate a matrix to represent the tree. An object sequence can be grouped level by level. The first level marks are used to group the object sequence first; afterward, each grouping is to group the group representatives in the lower level; marks of each level relates to one row (or one column) of the related matrix; each mark is an element of the matrix. An element of the matrix can include multiple data for A-B tree or multiple dimension tree. Matrix can be structure matrix, or entity matrix of a tree. Structure matrix stores binary 0, or 1. Entity matrix stores real data.

The marking procedure of nodes of a tree is similar to the procedure above.

The marking procedure of object sequence is illustrated FIG. 3 and FIG. 4.

Tree structure can be represented by left matrix, or right matrix, or left right matrix, or trapezoid matrix, or list matrix;

the characteristics of right matrix of a tree is: the root of tree at the right corner of the matrix; the first generation children of the parent at the next row, the children counted from right to left, the rightest child of them just below the parent, and the other children at the left side;

the characteristics of left matrix of a tree is: the root of tree at the left corner of the matrix; the first generation children of the parent at the next row, the children counted from left to right, the leftest child of them just below the parent, and the other children at the right side;

the characteristics of left right matrix of a tree is: the root of tree at the first row of the matrix, the first generation children of the parent at the next row, and divided them into two parts: left part and right part; the right part right to the parent, and the left part left to the parent; in each column of the matrix only one element related to one node of tree structure;

the characteristics of trapezoid matrix of a tree is: the trapezoid matrix is related to N order tree structure, consisting of one dimension arrays arranged from top to bottom, the number element of the arrays is calculated by $N^m$, (m=0,1,2 . . . ), and the elements related to the nodes of the tree structure;

the characteristics of list matrix of a tree is: list matrix is related to trapezoid matrix; putting elements of trapezoid matrix into a list, from top to bottom and from left to right, formed the list matrix.

The matrixes above are illustrated in FIG. 5, FIG. 6, . . . , and FIG. 12.

Processing methods are described as following:

Object processing comprising at least one step of the following:

searching child by right matrix(left matrix is similar): if child exist, the child are in the row bellow the current node, and between the column the current node located, and the column just right to the parent's first left sibling, searching parent by right matrix (left matrix is similar): scan from the node just above current node to its right, the first node not null is the parent;

searching sibling by right matrix (left matrix is similar): all nodes in the row the current node located, are sibling each other;

searching family by right matrix (left matrix is similar): the family for the current node is a sub array: the above row is the row the current node located, the right column is the column the current node located, the left column is the column just right to the current node's nearest left sibling; or leftest column of the R array, if no left sibling;

searching child by trapezoid matrix: if current is J-th node on [K−1]-th array, then, the first child of the node is in [K]-th array, the element is N*J;

searching parent by trapezoid matrix: if current is J-th node on [K]-th array, then, the parent is in [K−1]-th array, the element is J/N;

searching sibling by trapezoid matrix: the nodes on K-th array are sibling each other;

searching the node data number by trapezoid matrix: if the tree is A-B tree, DATANUMBER=N−1;

Assume a node in the position of J in the list array; then searching level by list matrix: if the node J in $[N^k, N^{k+1})$, then the level of J is k;

searching child for the node J by list matrix: assuming J is at the K level; the first child is in (K+1) level, and at $N^{k+1}+(J-N^k)*N$;

searching parent by list matrix: assuming J is at the K level; the parent is in (K−1) level, and at $N^{k-1}+(J-N^k)/N$;

searching sibling by list matrix: the nodes in $[N^k, N^{k+1})$ are sibling each other; searching child for the root by list matrix: assuming the searched data is X, assume the order is N, according to the tree type, A-B tree or multi-dimension tree, calculate the child number for each node passed, assume the child number for each level are $j_0, j_1, j_2, \ldots j_k$; for each search step, the child number from the root can be calculated by $N^{k+1}+(J_k-N^k)*N$.

5.1 Right Matrix (RA), Left Matrix (LA), Left Right Matrix (LRA) Matrix

Matrix of a tree can be generated by tree nodes marked by M mark, or by marking an object sequence by M mark.

Multilevel mark can be classified four classes: Right A multilevel mark, Left A multilevel mark, Right B multilevel mark, and Left B multilevel mark. The matrix related to multilevel mark above is Right A matrix, Left A matrix, Right B matrix, and Left B matrix respectively.

Right A matrix, Left A matrix, Left Right matrix is represented by RA, LA, LRA respectively.

Structure and data of a tree can be store in one matrix, and also can store in matrixes separately. It can usually save space if the tree structure is stored in a binary matrix, and the tree data is stored in a list matrix. It is compact and simple if the structure and the data store in one matrix, but usually needs more space than former.

The element of tree node can be empty or objects, which can be same class of objects, or different classes of objects. If different classes of objects, the node can store pointers, each of which points to the related object.

Tree matrix can be generated top down, root to leave; or down up, leave to root. The generating of matrix by marking an object sequence is shown in Section 4.

FIG. 5 is a block diagram illustrating a tree.

FIG. 6 is a block diagram illustrating Left Right Matrix (LRA) of FIG. 5, in each column of the matrix only one element related to one node of tree structure; the first generation children of the parent at the next row, and divided them into two parts: left part and right part; the right part right to the parent, and the left part left to the parent.

FIG. 7 is a block diagram illustrating Right Matrix (RA) of FIG. 5, the root of tree at the right corner of the matrix; the first generation children of the parent at the next row. RA can be generated by compressing LRA, compressing Right child of each node of LRA to the column of the node from the right side of the matrix, and keeping the correct relation of the family.

FIG. 8 is a block diagram illustrating Left Matrix (LA) of FIG. 5, the root of tree at the left corner of the matrix; the first generation children of the parent at the next row. LA can be generated by compressing LRA, compressing Left child of each node of LRA to the column of the node from the Left side of the matrix, and keeping the correct relation of the family.

Alphabetic Tree by RA Matrix

Alphabetic tree relates to a set of key words.

EXAMPLE 1

Assume a set of key words is: K={xem,xul,xal,wul,wen, wim, wil,wan,zi,zom,zol,yum,yon,yo}.

(Refer to: Data structure, Xu Zhuoqun, High Education publication Co Publish C. 1987).

FIG. 9 is a block diagram illustrating an alphabetic tree represented by RA matrix.

EXAMPLE 2

An alphabetic trie represented by RA matrix.

FIG. 10 is a block diagram illustrating an alphabetic tree, trie; the trie structure in (a) is represented by Right Matrix, and the letters are filled in according to the word in (b), related: word: ant, anteater, antelope, chicken, deer, duck, goat, goldfish, goose, horse.

(Refer to: FIG. 13.2, A practical introduction to Data structures and Algorithm Analysis, second edition , By Shaffer, C. A., Electronic publication Co. 2002)

5.2 Trapezoid Matrix

Definition of trapezoid matrix: a matrix consists of 0, 1, . . . , K rows, the number of elements of rows satisfy the condition: $N^k$, N) 1 and N is integer.

Trapezoid matrix can be used to represent A-B tree, this case, the elements relate to nodes of the tree.

There are (N−1) data in an N order A-B tree. The relation of dimension D and the order of a multiple dimension tree is $N=2^D$, $D=\log_2 N$. Therefore, the nodes of trapezoid matrix for A-B tree are (N−1), and D for multiple dimension tree. The data of nodes can also be stored in a one dimension array.

The trapezoid matrix is called as logic trapezoid matrix, if the elements of the nodes are 0, or 1. Logic matrix can be used to represent the tree structure. The data of a tree can be store consecutively in an array if there is a logic matrix for the tree, thus to save space. It is easy to recover the matrix with real data by the logic matrix and the data array.

FIG. 11 is a block diagram illustrating $B^+$ tree. (Refer to: FIG. 10.16, A practical introduction to Data structures and Algorithm Analysis, second edition, By Shaffer, C. A., Electronic publication Co. 2002).

FIG. 12 is a block diagram illustrating trapezoid matrix of $B^+$ tree in FIG. 11. In the FIG. 12, a Left matrix is used. A Right matrix may be used, and proper matrix can be selected according to practice.

Next is representing trapezoid matrix by arrays.

Array R1, R2, R3 relate the first row to third row in FIG. 12 respectively.

R3[3]=33;

R2[4][3]=18,23; 48

R1[16][5]=18,12,26;18,19,20,21,22;23,30,31;33,46,47; 48,60,62;

5.3 List Matrix

Definition of list matrix: putting the elements of a trapezoid matrix into a one dimension array according to top down, left right sequence, then form a list, which is called as list matrix.

List matrix can be used to represent A-B tree and multiple dimension tree.

There are (N−1) data in an N order A-B tree. The relation of dimension D and the order of a multiple dimension tree is $N=2^D$, $D=\log_2 N$. Therefore, the nodes of list matrix for A-B tree are (N−1), and D for multiple dimension tree.

The list matrix is called as logic list matrix, if the elements of the nodes are 0, or 1. Logic matrix can be used to represent the tree structure. The data of a tree can be store consecutively in an array if there is a logic matrix for the tree, thus to save space. It is easy to recover the list matrix with real data by the logic matrix and the data array. Binary tree, 4 tree (parent node can have 4 children at most), and $B^+$ tree all can be represented by list matrix.

List matrix can be segmented, and segments can be linked by M mark.

5.4 Block Matrix

The said block matrix consists of sub tree. Sub tree can be represented by one kind of matrix above, the matrix related to sub tree is called block matrix. The block matrix, which does not include the root at top of the whole tree, relates to one leave of the block matrix in one level higher.

6. Object Processing Apparatus

The object processing methods above can be described as apparatus.

In object representing and processing, object can be represented by non-MMC, MMC, or M Mark; a apparatus consisting of at least one apparatus of the following:

(1) multilevel mark code apparatus: consisting of code segments, the said code segment consisting of binary bit; mark bit selected in each segment; and the mark bits of the segments of object code marked with multilevel mark;

(2) multilevel mark code apparatus with class segment: a multilevel mark code apparatus for multiple classes of objects consisting of two parts: class part and coding part; for N coding segment MMC, if N>2, then the class segment contains the information which can tell if the next segment (or segments) is class segment or coding segment (or segments); if N=2, then class segment contains the information which can tell the coding class of the next segment; the class part can be one or multiple segments;

(3) one of the following multilevel mark code apparatus:
 (A) Linked multilevel mark code which is related to an object in the data source by its location;
 (B) embedded multilevel mark code which is embedded together with its related object, and coded the code range inside;
 (C) Inter mark multilevel mark code which is located in object sequence and coding the object relation information inside;
 (D) combined multilevel mark code which combines the object codes according to coding method of multilevel mark code;

(4) multiple property code apparatus: consisting of multiple property codes for multiple property object, each of the multiple property codes related to one property of the multiple property object, and the multiple property object in an object group is represented by multiple property code related to its property;

(5) sequenced full pronunciation apparatus of Chinese character: the apparatus consisting of two bytes, in which two letters, each letter 5 bits; and 5 pronunciation notes, 3 bits; the size sequence of the two letters are selected according with the sequence of Chinese syllable represented by Pinyin (or phonetic notation); the value of the 3 bits is selected according with the note sequence in the standard dictionary;

(6) sequenced full pronunciation comparing apparatus: the apparatus consisting of
 (A) retrieving apparatus: retrieving sequenced full pronunciation string from two Chinese character strings;
 (B) comparing apparatus: comparing the strings by comparing related sequenced full pronunciation strings;
 retrieving comparison result of character strings according to the comparison above;

(6) coded input object processing apparatus: consisting of object input code table; the input code table of coded input objects consists of the relation between each singular object and its input code, as the object code sequence is consistent with the input code sequence, then only consists of input codes of the objects sequenced according to the object code sequence; object codes can be no-multilevel mark code or multilevel mark code; the processing method for coded objects comprises the step of generating the input code for the data to be processed according to the object input table;

for multiple property object, eliminating the confusion of input codes for one object code by multiple property codes;

Object inputting or object searching for coded input objects comprising the steps of:
 (A) inputting input codes for objects to be inputted or to be searched;
 (B) generating input codes of object codes in related data according to object input code table;
 (C) getting the inputted objects or searched objects by comparing the inputted input codes with the generated input codes;

The output method of object input codes comprises of the steps of the following: Generating input codes of object codes in related data according to object input code table;

In the object processing above, multiple input code tables can be used, may contain one or multiple data resource; In the comparison, if too many objects matched, input the input codes related to another input method, and then select the result matched input codes related to multiple input methods;

(8) Coded input objects cascade input apparatus consist of:
 a compound input code table, which contains the relation between objects and input codes for two or more input methods; or multiple input code tables, each of which relates to one input method; cascade input method realize object or object group inputting by inputting input codes of two or more input method, cascaded inputting comprising the steps of:
 (A) inputting input codes of one class;
 (B) comparing the inputted codes with related class of input codes in the compound input code table or with input codes of related single input code table;
 (C) go to (E) if the satisfied results selected, then;
 (D) if too many objects or object groups to be selected, inputting input codes of another input method, then selecting the satisfied results;
 (E) retrieving the satisfied results;

(9) multilevel mark apparatus: consisting at least one of the following apparatus:

Right A multilevel mark apparatus: the rightest object in an object group marked with A mark; the other N objects in the object group with B mark; A Mark is called as group representative;

Left A multilevel mark apparatus: the leftest object in an object group marked with A mark; the other N objects in the object group with B mark; A Mark is called as group representative;

Right B multilevel mark apparatus: the rightest object in an object group marked with B mark; the other N objects in the object group with A mark; B Mark is called as group representative;

Left B multilevel mark apparatus: the leftest object in an object group marked with B mark; the other N objects in the object group with A mark; B Mark is called as group representative;

The said N is positive integer or 0.

Taking electronic dictionary as an example of the apparatus, which consists of MMC apparatus with multiple languages, coded input object input apparatus and sequential full pronunciation apparatus for Chinese character codes. Comparing the dictionary used now, the dictionary can save storage space, and provide word level inputting, input code searching function. Languages in the dictionary is unlimited by .MMC. With Chinese multiple property apparatus, the dictionary can output correct pinyin and Chinese speech.

BRIEF DESCRIPTION OF THE DRAWINGS

FIG. 1 is a block diagram illustrating a 2 byte MMC with class byte. Right 0 multilevel mark is adopted for the MMC, the first byte is a class byte with mark bit 1 in the first bit and with mark bit 0 in the first bit of the second byte.

FIG. 2 is a block diagram illustrating a 3 byte MMC. Right 0 multilevel mark is adopted for the MMC, the mark bit is in the first bit of each byte, and the value of the mark bits is 1, 1, and 0, respectively. The first byte is a class byte, which tells that if the second byte is a class byte or the class of the code consisted of the second and the third byte. If the second byte is a class byte, then it tells what kind of code the third byte is.

FIG. 3 is a block diagram illustrating marking procedure by right 1 multilevel mark for string with Chinese and English text: "汉字是表意文字·English is "字母式","语言"and a matrix is generated by the marking procedure. 0, 1 in FIG. 3 are marks.

FIG. 4 is a block diagram illustrating tree generating procedure by multilevel marking. The leaves of the tree is represented by characters, the intersection of lines is inner node, and the phrase or sentence consisted by characters can be represented by inner nodes.

FIG. 9 is a block diagram illustrating an alphabetic tree by RA, the set of key words is: K={xem,xul,xal,wul,wen,wim, wil,wan,zi,zom,zol,yum,yon,yo}.

FIG. 10 is a block diagram illustrating an alphabetic tree, trie; (a) is the trie structure represented by Right Matrix, and the letters are filled in according to the words in (b), related words: ant, anteater, antelope, chicken, deer, duck, goat, goldfish, goose, horse.

FIG. 12 (a) lists the element value in the trapezoid matrix, because of at most 3 groups of data in a node, at most 4 children for one node. 3 elements in the first level of the trapezoid matrix; 12 elements in the second level; the leaf nodes in the third level, 5 records can be stored in each node at most; only part of the nodes listed in the FIG 12 (b), which is a simplified form of (a), One element in the matrix is related to one node in (a), the value is the first data in each node.

MORE EXAMPLES TO REALIZE THE INVENTION

Figures 5, 6, 7, 8:
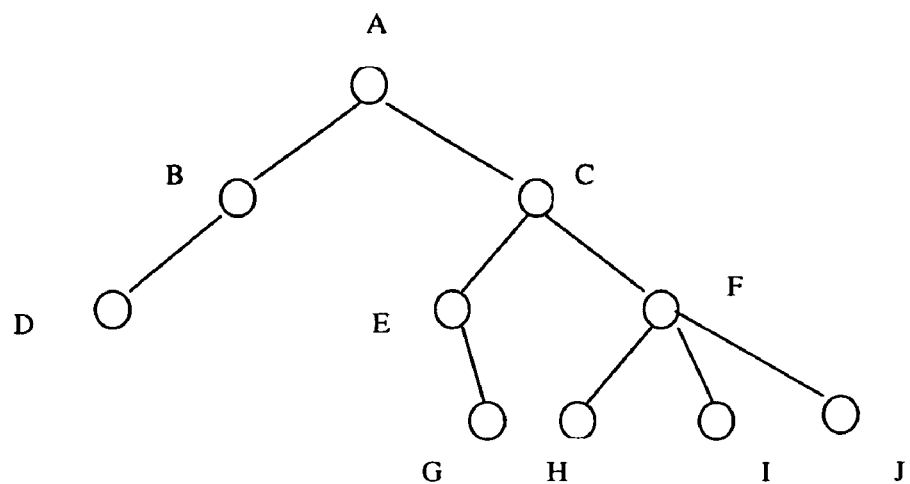
FIG. 5 is a block diagram illustrating a tree, and in the figure, A, B, C . . . J is nodes of the tree.
FIG. 6 is a block diagram illustrating Left Right Matrix (LRA) of FIG. 5, in each column of the matrix only one element existed and related to one node of tree structure; the first generation children of the parent at the next row, and divided into two parts: left part and right part; the right part right to the parent, and the left part left to the parent.
FIG. 7 is a block diagram illustrating Right Matrix (RA) of FIG. 5, the root of tree at the right corner of the matrix; the first generation children of the parent at the next row, the rightest child of them just below the parent, and the other children at the left side.
FIG. 8 is a block diagram illustrating Left Matrix (LA) of FIG. 5, the root of tree at the left corner of the matrix; the first generation children of the parent at the next row, the leftest child of them just below the parent, and the other children at the right side.
Figure 11:
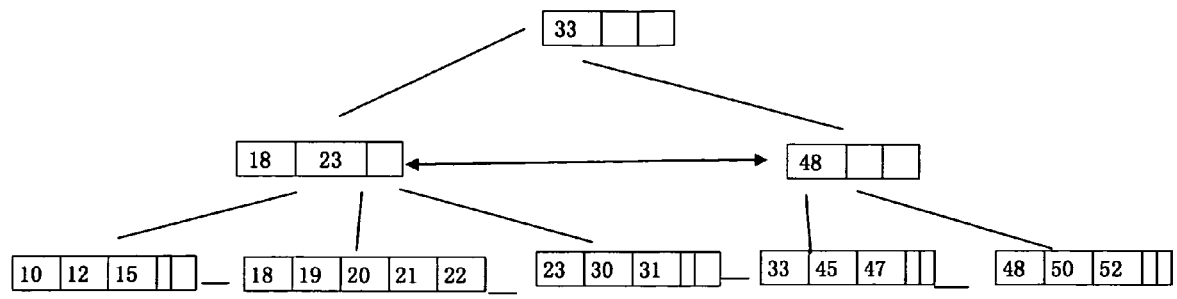
FIG. 11 is a block diagram illustrating B$^+$ tree of order 4. Three groups of data can be stored in a node. The leaf nodes can store 5 groups of data at most, the dada listed in the Figure are data stored in the nodes.
Figure 12:
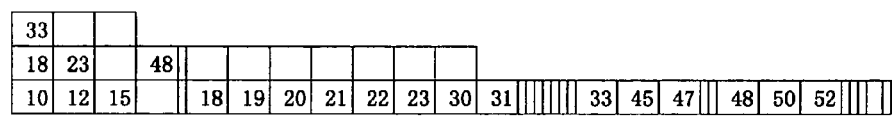
FIG. 12 is a block diagram illustrating trapezoid matrix of B$^+$ tree in FIG. 11.
Figure 12:
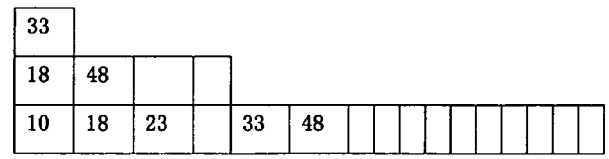

Besides examples introduced above, more examples are as following:

Operating system for multiple objects and multiple languages: the number of languages is unlimited, and the character codes are consistent with their original codes. System stores the MMC classes, MMC and non-MMC can be transformed from each other. Text in original codes of a language is store in external storage media; and the MMC form is stored inside the main memory. MMC codes of a language are transformed into original codes as output. Operating system can provide input method, search methods for coded input objects presented in this invention.

It is easy to realize multiple language searching, web addressing, and domain name by MMC. Any objects, such as video, voice, image; can be used in text and just like characters.

It is easy to raise Chinese searching from character level to word level searching by this invention, and the searching become more precise, more complete and quicker. If the marks in marking up languages and formatted text are replaced by MMC, then space saved, and operations simplified.

What is claimed is:

1. A method of Object processing, wherein the object is encoded by multilevel mark code; and the encoding of multilevel mark code comprising the steps of:
    (1) object code consisting of code segments, and the code segment consisting of binary bits;
    (2) selecting mark bit in each segment of the code;
    (3) marking mark bits of the code segments by multilevel mark.

2. The method as defined in claim 1 wherein further comprising at least one step of the following steps:
    (1) transforming non-multilevel mark code into multilevel mark code by multilevel direction transformation;
    (2) transforming multilevel mark code into non-multilevel mark code by single direction transformation;
    the said transforming is based on the relation between non-multilevel mark code and multilevel mark code; the relation is as following:
    assuming the non-multilevel mark code of one kind of object consisting of N bytes, N>=1, among them if there are M bytes without mark bit, then the code can be represented by $2^M$ classes of multilevel mark codes; adding 1 class byte, there are $2^M$ different kind of values, each relating to one of $2^M$ class multilevel mark code; if there are J kind of non-multilevel mark codes with N bytes, each kind of them can be represented by $K_1, K_2, \ldots K_j$ of multilevel mark code respectively, then amount of all classes of multilevel mark code is $$S=K_1+K_2+\ldots+K_j$$

If the class byte can't have enough space to represent all of them, adding more class byte to the multilevel mark code;
the said multilevel direction transformation comprising steps of:
    (1) recognizing the class of non-multilevel mark code;
    (2) selecting the class byte of multilevel mark code according to the class of non-multilevel mark code and its related mark bit value of the multilevel mark code;
    (3) taking non-multilevel mark code as the coding part of multilevel mark code, and making the mark bits according to the coding requirement of multilevel mark code;
    (4) combing the class byte and the coding part as multilevel mark code of the non-multilevel mark code;
    the class part can be omitted if the class of multilevel mark code can be known by the context; if the length of multilevel mark code is equal to the length of a kind of multilevel mark code without class part, adding one class segment more which contains the class information of the class segment of original multilevel mark code; the rest is deduced by analogy;
    the said single direction transformation comprising steps of:

resuming the non-multilevel mark code by taking the coding part of multilevel mark code as the non-multilevel mark code, according to the relation of class byte and related non-multilevel mark code, and according to the mark bit value; removing the related class byte if exists.

3. The method as defined in claim 1 wherein further comprising at least one of the following multilevel mark code:

Linked multilevel mark code which is related to an object in the data source by its location;

embedded multilevel mark code which is embedded together with its related object, and coded the code range inside;

Inter mark multilevel mark code which is located in object sequence and coding the object relation information inside;

combined multilevel mark code which combines the object codes according to coding method of multilevel mark code.

4. The method as defined in claim 1 wherein the characteristic of object processing is as following:

a sequence consisted of N nodes, N>=1, each node related to an object, which is called node object, node object consisted of M sub objects, M>=0; then, node object and sub node object can be represented and processed by multilevel mark code.

5. The method as defined in claim 1 wherein the data compression is processed by one of the following steps:

(1) representing the repeating times by multilevel mark code as compressing repeated objects in an object sequence;

(2) representing objects in high frequency by shorter multilevel mark code;

(3) representing objects in low value by shorter multilevel mark code;

(4) Setting up an object group library outside the object sequence, and representing the related object group in the sequence by multilevel mark code;

(5) Setting up an object group library inside the object sequence, and representing the related object group in the sequence by multilevel mark code.

6. A method of Object representing and processing, characterized as following:

representing and processing a multiple property object by multiple property code;

relating a multiple property code with a property of the multiple property object;

representing a multiple property object in an object group by relative multiple property code.

7. The method as defined in claim 6 wherein the said object is Chinese polyphone character with N pronunciations, N>1; encoding (N−1) multiple property codes to the character, each relating to one pronunciation; representing a polyphone character in a phrase by its multiple property code with correct pronunciation.

8. The method as defined in claim 7 wherein further characterized as following: for Chinese polyphone character with N different pronunciations, the added (N−1) multi-property codes with mark bit 1, 1, if the original code of the polyphone character belongs to GB2312, i.e. with mark bit 1, 0; if the original code of the polyphone character belongs to GBK but not in GB2312, i.e. the original mark bit of second byte is 0.

9. A method of Object representing and processing wherein characterized as following:

the input code table of coded input objects only consists of the relation between each singular object and its input code, as the object code sequence is consistent with the input code sequence, then only consists of input codes of the objects sequenced according to the object code system sequence; object codes can be no-multilevel mark code or multilevel mark code; the processing method for coded input objects comprises of generating the input code from the object codes, that is to generate the input code for the data to be processed according to the object input table; for multiple property object, eliminating the confusion of input codes for one object code by multiple property codes;

Object inputting or object searching for coded input objects comprising the steps of:

(1) inputting input codes for objects to be inputted or to be searched;

(2) generating input codes of object codes in related data according to object input code table;

(3) retrieving the inputted objects or searched objects by comparing the inputted input codes with the generated input codes;

The output method of object input codes comprises of the steps of the following:

Generating input codes of object codes in related data according to object input code table;

In the object processing above, multiple input code tables can be used, each relates to one input method; and one or multiple data sources can be used; in the comparison, if too many objects are matched, inputting another input codes related to another input method, and then select the objects to be inputted or searched from the objects or object groups matched multiple input code tables.

10. The method as defined in claim 9 wherein the object is Chinese character, input code table consists of Chinese sequenced full pronunciations sequenced according to the Chinese character code system sequence; the said Chinese sequenced full pronunciation of a character code consists of two bytes, in which two letters, each letter 5 bits; and 5 pronunciation notes, 3 bits; the size sequence of the two letters are selected according with the sequence of Chinese syllable represented by Pinyin (or phonetic notation); the value of the 3 bits is selected according to the note sequence in the standard dictionary.

11. A method of Object representing and processing, characterized as following: Coded input objects can be inputted by cascade input method; in which a compound input code table can be used, the compound input code table contains the relation between objects and input codes for two or more input methods, or multiple input code tables can be used, each of the tables relates to one input method; cascade input method realize object or object group inputting by inputting input codes of two or more input method, cascaded inputting comprising the steps of:

(1) inputting input codes of one input method;

(2) comparing the inputted codes with input codes related in the compound input code table or with input codes related in a single input code table;

(3) going to (5) if objects or object groups to be selected are satisfied;

(4) if too many objects or object groups waiting to be selected, inputting input codes of another input method, then selecting the results satisfied both input methods;

(5) retrieving the satisfied results.

12. A method of Object representing and processing, characterized as following:

marking object groups in an object sequence with multilevel mark;

the said multilevel mark is one of the following:

Right A multilevel mark: the rightest object in an object group marked with A mark; the other N objects in the object group marked with B mark; A Mark is called as group representative;

Left A multilevel mark: the leftest object in an object group marked with A mark; the other N objects in the object group marked with B mark; A Mark is called as group representative;

Right B multilevel mark: the rightest object in an object group marked with B mark; the other N objects in the object group marked with A mark; B Mark is called as group representative;

Left B multilevel mark: the leftest object in an object group marked with B mark; the other N objects in the object group marked with A mark; B Mark is called as group representative;

The said N is positive integer or 0.

13. The method as defined in claim 12, wherein objects are encoded by multilevel mark code; the coding of multilevel mark code comprising the steps of:
  (1) object code consisting of code segments, each segment consists of coding locations;
  (2) selecting at least one coding location as marking location for each segment;
  (3) marking the marking locations of each segment by multilevel mark.

14. The method as defined in claim 13 wherein
the coding of multilevel mark code for multiple classes of objects, dividing multilevel mark code into two parts: class part and coding part;
for N coding segments of multilevel mark code, if N>2, then the class segment contains the information which can tell if the next segment (or segments) is class segment or class information of coding segment (or segments); if N=2, then class segment contains the information which can tell the coding class of the next segment; the class segment can be one or multiple segments; the class segment can also be part of a segment;
as scanning the multilevel mark code sequence with multiple classes along one direction, if the code changes from one class to another class, then the multilevel mark code should be with class segment related to the object class; later if the class of multilevel mark code not change, then the class segment of multilevel mark code can be omitted; if it is a default class of multilevel mark code for a definite length of multilevel mark code, then the class segment of multilevel mark code can also be omitted.

15. A method of Object representing and processing, characterized as following:
representing and processing tree structure by right matrix, or left matrix, or left right matrix, or trapezoid matrix, or list matrix;
the characteristics of right matrix of a tree is: the root of tree at the right corner of the matrix; the first generation children of the parent at the next row, the children counted from right to left, the rightest child of them just below the parent, and the other children at the left side;
the characteristics of left matrix of a tree is: the root of tree at the left corner of the matrix; the first generation children of the parent at the next row, the children counted from left to right, the leftest child of them just below the parent, and the other children at the right side;
the characteristics of left right matrix of a tree is: the root of tree at the first row of the matrix, the first generation children of the parent at the next row, and divided them into two parts: left part and right part; the right part right to the parent, and the left part left to the parent; in each column of the matrix only one element related to one node of tree structure;
the characteristics of trapezoid matrix of a tree is: the trapezoid matrix is related to N order tree structure, consisting of one dimension arrays arranged from top to bottom, the number element of the arrays is calculated by $N^m$, (m=0,1,2 . . . ), and the elements related to the nodes of the tree structure;
the characteristics of list matrix of a tree is: list matrix is related to trapezoid matrix; putting elements of trapezoid matrix into a list, from top to bottom and from left to right, formed the list matrix.

16. A apparatus of object representing and processing, the object is represented by non-multilevel mark code, or multilevel mark code, or multilevel mark, wherein comprising at least one of the following apparatus:
  (1) multilevel mark code apparatus: consisting of code segments, the said code segment consisting of binary bit; mark bit selected in each segment; and the mark bits of the segments of object code marked with multilevel mark;
  (2) multilevel mark code apparatus with class segment: a multilevel mark code apparatus for multiple classes of objects consisting of two parts: class part and coding part; for N coding segment MMC, if N>2, then the class segment contains the information which can tell if the next segment (or segments) is class segment or coding segment (or segments); if N=2, then class segment contains the information which can tell the coding class of the next segment; the class part can be one or multiple segments;
  (3) one of the following multilevel mark code apparatus:
    (A) Linked multilevel mark code which is related to an object in the data source by its location;
    (B) embedded multilevel mark code which is embedded together with its related object, and coded the code range inside;
    (C) Inter mark multilevel mark code which is located in object sequence and coding the object relation information inside;
    (D) combined multilevel mark code which combines the object codes according to coding method of multilevel mark code;
  (4) multiple property code apparatus: consisting of multiple property codes for multiple property object, each of the multiple property codes related to one property of the multiple property object, and the multiple property object in an object group is represented by multiple property code related to its property;
  (5) sequenced full pronunciation apparatus of Chinese character: the apparatus consisting of two bytes, in which two letters, each letter 5 bits; and 5 pronunciation notes, 3 bits; the size sequence of the two letters are selected according with the sequence of Chinese syllable represented by Pinyin (or phonetic notation); the value of the 3 bits is selected according with the note sequence in the standard dictionary;
  (6) sequenced full pronunciation comparing apparatus: the apparatus consisting of
    (A) retrieving apparatus: retrieving sequenced full pronunciation string from two Chinese character strings;
    (B) comparing apparatus: comparing the strings by comparing related sequenced full pronunciation strings; retrieving comparison result of character strings according to the comparison above;

(7) coded input object processing apparatus: consisting of object input code table; the input code table of coded input objects consists of the relation between each singular object and its input code, as the object code sequence is consistent with the input code sequence, then only consists of input codes of the objects sequenced according to the object code sequence; object codes can be no-multilevel mark code or multilevel mark code; the processing method for coded objects comprises the step of generating the input code for the data to be processed according to the object input table;

for multiple property object, eliminating the confusion of input codes for one object code by multiple property codes;

Object inputting or object searching for coded input objects comprising the steps of:
  (A) inputting input codes for objects to be inputted or to be searched;
  (B) generating input codes of object codes in related data according to object input code table;
  (C) getting the inputted objects or searched objects by comparing the inputted input codes with the generated input codes;

The output method of object input codes comprises of the steps of the following:

Generating input codes of object codes in related data according to object input code table;

In the object processing above, multiple input code tables can be used, may contain one or multiple data resource; In the comparison, if too many objects matched, input the input codes related to another input method, and then select the result matched input codes related to multiple input methods;

(8) Coded input objects cascade input apparatus consist of:

a compound input code table, which contains the relation between objects and input codes for two or more input methods; or multiple input code tables, each of which relates to one input method; cascade input method realize object or object group inputting by inputting input codes of two or more input method, cascaded inputting comprising the steps of:
  (A) inputting input codes of one class;
  (B) comparing the inputted codes with related class of input codes in the compound input code table or with input codes of related single input code table;
  (C) go to (E) if the satisfied results selected, then;
  (D) if too many objects or object groups to be selected, inputting input codes of another input method, then selecting the satisfied results;
  (E) retrieving the satisfied results;

(9) multilevel mark apparatus: consisting at least one of the following apparatus:

Right A multilevel mark apparatus: the rightest object in an object group marked with A mark; the other N objects in the object group with B mark; A Mark is called as group representative;

Left A multilevel mark apparatus: the leftest object in an object group marked with A mark; the other N objects in the object group with B mark; A Mark is called as group representative;

Right B multilevel mark apparatus: the rightest object in an object group marked with B mark; the other N objects in the object group with A mark; B Mark is called as group representative;

Left B multilevel mark apparatus: the leftest object in an object group marked with B mark; the other N objects in the object group with A mark; B Mark is called as group representative;

The said N is positive integer or 0.

* * * * *